United States Patent
Lefebvre et al.

(10) Patent No.: US 7,336,275 B2
(45) Date of Patent: Feb. 26, 2008

(54) PSEUDO RANDOM NUMBER GENERATOR AND METHOD

(75) Inventors: Laurent Lefebvre, Framingham, MA (US); Stephen L. Morein, Cambridge, MA (US)

(73) Assignee: ATI Technologies Inc., Markham, Ontario (CA)

( * ) Notice: Subject to any disclaimer, the term of this patent is extended or adjusted under 35 U.S.C. 154(b) by 439 days.

(21) Appl. No.: 10/236,127

(22) Filed: Sep. 6, 2002

(65) Prior Publication Data

US 2004/0048653 A1    Mar. 11, 2004

(51) Int. Cl.
| | |
|---|---|
| G09G 5/00 | (2006.01) |
| G09G 5/02 | (2006.01) |
| G06T 15/50 | (2006.01) |
| G06T 15/60 | (2006.01) |
| G06F 1/02 | (2006.01) |
| G06F 7/58 | (2006.01) |
| G06F 17/00 | (2006.01) |
| G06F 19/00 | (2006.01) |
| A63F 9/24 | (2006.01) |
| A63F 13/00 | (2006.01) |

(52) U.S. Cl. ............ 345/426; 345/422; 345/596; 345/597; 345/632; 345/634; 345/554; 708/250; 463/22

(58) Field of Classification Search ........ 708/250; 463/22; 345/419, 424–427
See application file for complete search history.

(56) References Cited

U.S. PATENT DOCUMENTS

| | | | | |
|---|---|---|---|---|
| 5,251,165 | A * | 10/1993 | James, III ........... | 708/250 |
| 5,351,300 | A * | 9/1994 | Quisquater et al. ........ | 380/46 |
| 5,416,783 | A * | 5/1995 | Broseghini et al. ........ | 714/728 |
| 5,508,822 | A * | 4/1996 | Ulichney et al. ........ | 358/3.1 |
| 5,553,208 | A | 9/1996 | Murata et al. | |
| 5,892,517 | A | 4/1999 | Rich | |
| 5,983,252 | A * | 11/1999 | Clapp ........... | 708/250 |
| 6,025,922 | A * | 2/2000 | Marsden ........... | 358/1.1 |
| 6,459,434 | B1 * | 10/2002 | Cohen et al. ........ | 345/586 |
| 6,546,052 | B1 * | 4/2003 | Maeda et al. ........ | 375/240.08 |
| 6,731,406 | B1 * | 5/2004 | Ganapathy et al. ........ | 358/3.1 |
| 6,747,660 | B1 * | 6/2004 | Olano et al. ........ | 345/582 |
| 6,820,198 | B1 * | 11/2004 | Ross ........... | 713/165 |
| 6,873,338 | B2 * | 3/2005 | Berstis ........... | 345/596 |
| 2002/0070933 | A1 * | 6/2002 | Hiroi ........... | 345/419 |
| 2003/0112875 | A1 * | 6/2003 | Kondo et al. ........ | 375/240.24 |
| 2004/0046765 | A1 | 3/2004 | Lefebvre et al. | |
| 2005/0007378 | A1 * | 1/2005 | Grove ........... | 345/582 |

(Continued)

OTHER PUBLICATIONS

Perlin Noise; Sep. 27, 2001; 13 pp.; http://freespace.virgin.net/hugo.elias/models/m_perlin.htm.

(Continued)

*Primary Examiner*—Ulka Chauhan
*Assistant Examiner*—Eric Woods
(74) *Attorney, Agent, or Firm*—Vedder, Price, Kaufman & Kammholz, P.C.

(57) ABSTRACT

A pseudo random number generator that generates a plurality of intermediate values, where each successive intermediate value is based, at least in part, on one of the succeeding intermediate values, where a final value based on a subset of the plurality of intermediate values. In application, the final value is based on performing a logical operation on the penultimate and last generated intermediate values.

11 Claims, 11 Drawing Sheets

U.S. PATENT DOCUMENTS

2005/0110792 A1    5/2005    Morein et al.

OTHER PUBLICATIONS

Darwyn Peachey, Steven Worley; Texturing and Modeling, Second Edition; 1998, 1994; pp. 7-122; Academic Press, Chestnut Hill, MA.

Clifton, M., "On-the-Fly Texture Computation for Real-Time Surface Shading." IEEE Computer Graphic and Applications, Mar./Apr. 1998, pp. 44-58.

* cited by examiner

FIG. 9A

PSEUDO RANDOM NUMBER GENERATOR AND METHOD

RELATED CO-PENDING APPLICATION

This application is related to co-pending U.S. application Ser. No. 10/236,323, filed Sep. 6, 2002, entitled "Gradient Noise Engine With Shared Memory", having as inventors Laurent Lefebvre and Stephen L. Morein, owned by instant assignee and incorporated herein by reference.

NOTICE OF COPYRIGHT

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The present invention generally relates to graphics processors and, more particularly, to a pseudo random number generator applicable for use with graphics processors and other processing equipment.

BACKGROUND OF THE INVENTION

In computer graphics applications, complex shapes and structures are formed through the sampling, interconnection and rendering of more simple shapes, referred to as primitives. These primitives, in turn, are formed by the interconnection of individual pixels. Objects are generated by combining a plurality of pixels together to form an outline of a shape (e.g. a cup). Texture is then applied to the individual pixels based on their location within a primitive and the primitives orientation with respect to the generated shape; thereby generating an object. The pixels colors are modified using textures. The individual components of a texture are called texels.

To make the rendered object look more realistic, noise is applied to the generated object resulting in the appearance of imperfections in the rendered object. Noise is applied by adding randomly generated data to the texels that comprise the object. A drawback associated with known noise generation techniques is that the noise data is independently computed for each pixel in the object. Thus, the circuitry used to generate the noise data takes up valuable real estate as such circuitry must be replicated many, many times on an integrated circuit chip surface.

Another drawback associated with known noise generation techniques is that because noise data is independently computed for each individual pixel, previously computed noise values and the information provided thereby are not reused. Thus, computational resources are wasted.

BRIEF DESCRIPTION OF THE DRAWINGS

The present invention and the associated advantages and features provided thereby, will become best understood and appreciated upon review of the following detailed description of the invention, taken in conjunction with the following drawings, where like numerals represent like elements, in which.

DETAILED DESCRIPTION OF THE INVENTION

Briefly stated, the present invention is directed to a pseudo random number generator which may be used, for example in a rendering engine. The pseudo random number generator provides a value which acts as an index, for example, to access a corresponding gradient noise table within a larger rendering engine. In operation, the random number generator receives initial input data, generates a plurality of intermediate values, where each successive intermediate value is based, at least in part, on a preceding intermediate value, and generates a final value based on a subset of the plurality of intermediate values. In an exemplary embodiment, the final value is generated by performing an exclusive-OR (XOR) operation on the bits which comprise intermediate value n−1 and intermediate value n, where n is the number of intermediate values generated.

The random number generator of the present invention takes up less real estate as compared to conventional random number generators by employing a plurality of gradient tables, each having different data provided therein. The main advantage of having different values in each of the gradient tables is that fewer entries per table are required to simulate multiple gradients. For example, if 64 gradients (e.g. values) are to be simulated and each gradient table contains the same information, 8 tables×64 entries would be required. According to the present invention, since all of the gradient tables have different values, only 8 entries per table are needed to achieve the same raw number of gradients.

For purposes of definition and explanation, in this description "&" means logical AND, "^" means logical exclusive-OR (XOR), "+" means logical OR, "!" means logical NOT, ">>" means shift bit locations a specified number to the right and "<<" means shift bit locations a specified number of bits to the left. Items within parenthesis "( )" have the highest logical priority, followed by "!", "&" and "+", in descending priority order.

Figure 1:
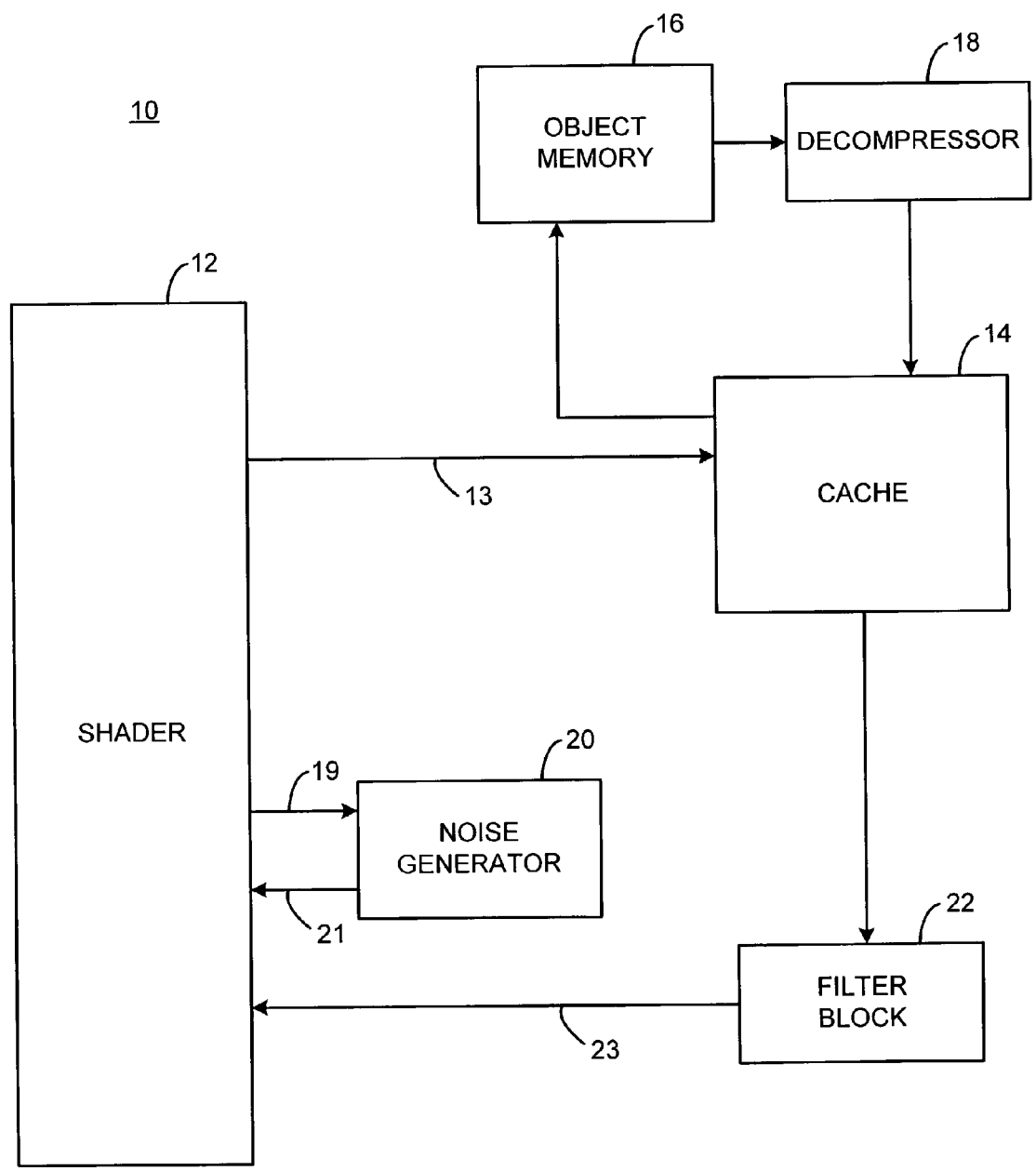
FIG. 1 is a schematic block diagram of a conventional rendering engine architecture.

Referring now to FIG. 1, illustrated therein is a schematic block diagram of a conventional rendering engine architecture. The rendering engine 10 includes a shader 12, a cache 14, object memory 16, decompressor 18, noise generator 20 and a filter block 22. The shader 12 may request an object to be rendered on line 13 and provide position information for such requested object on line 19. The object requested is provided to a cache 14, which then transmits the requested object to a filter block 22 for suitable prefiltering operations. The filtered object data is then transmitted to the shader on line 23. If the requested object is not located within the cache 14, the cache 14 then makes a request to the object memory 16 for such object. If the information is maintained within the object memory 16, the requested object, or the data representing the object, is provided to decompressor 18 before being transmitted to the cache 14. Once transmitted to the cache 14, the object is then filtered by the filter block 22 before being provided to shader 12.

Within the shader 12, noise is applied to the individual pixels that define the object to make the object look more realistic. Such noise is generated by the noise generator 20, which is then transmitted to the shader 12 on line 21. Within the shader 12, the generated noise and the corresponding object to which the noise is to be applied are combined and then subsequently transmitted to a rasterizer (not shown) for subsequent presentation on a display (not shown).

Figure 2:
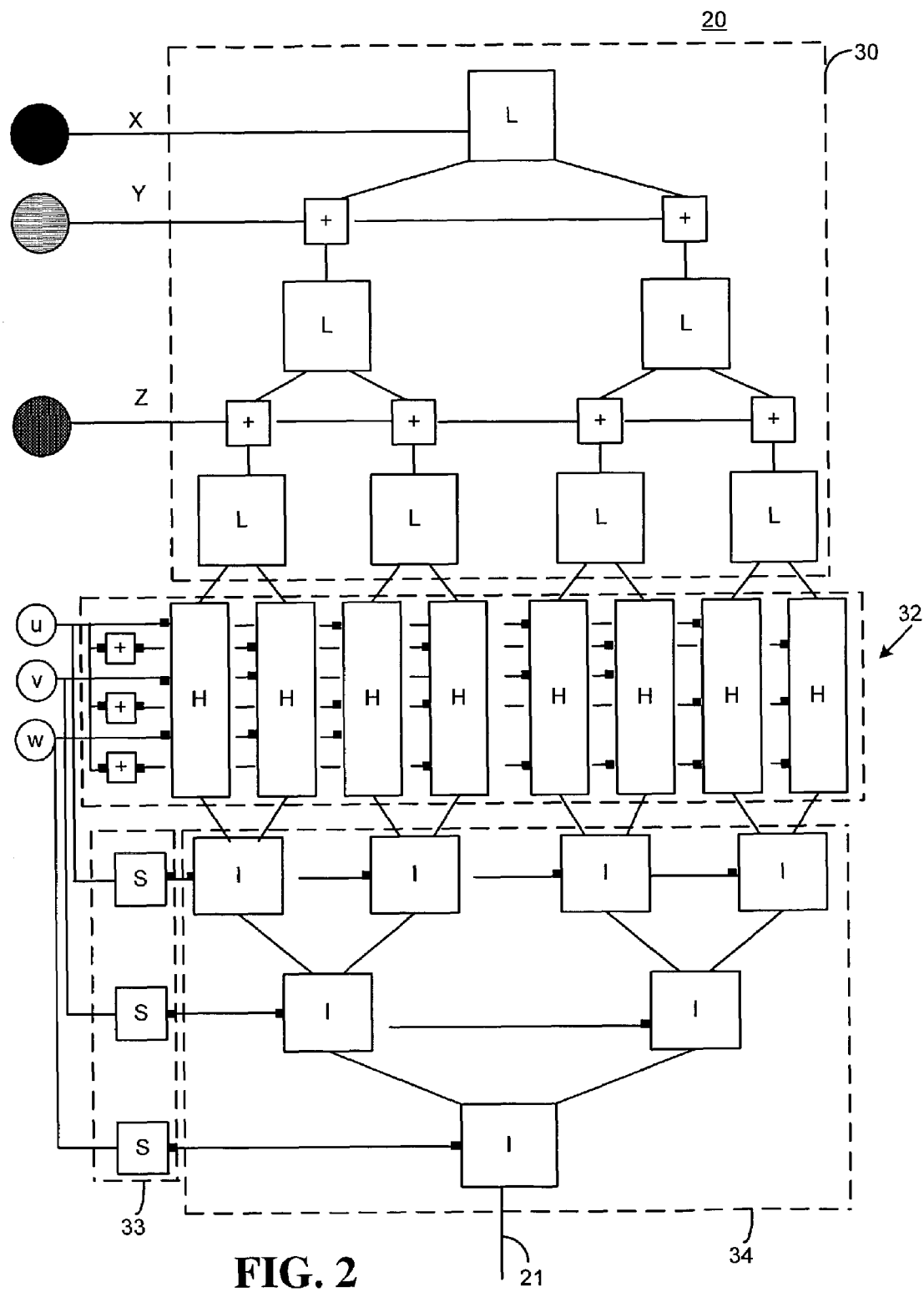
FIG. 2 is a schematic block diagram of a conventional noise generator employed by the rendering engine illustrated in FIG. 1.

As illustrated in FIG. 2, the conventional noise generator 20 includes a random index generator block 30, a gradient table block 32 and a trilinear interpolator block 34. The random index generator block 30 contains a plurality of random number generators (represented by L) which receive position location data (x, y, z) from the shader 12 and generates a corresponding index used to access corresponding gradient tables (represented by H) of the gradient table block 32. The gradient tables within the gradient table block 32 contain normalized vectors that include the eight closest neighbors to the point (e.g. pixel) of interest. The information provided by the gradient table block 32 is then provided to the trilinear interpolation block 34, which cubically interpolates a noise value at the point of interest.

The trilinear interpolation block 34 includes three, separate linear stages (represented by I). Each linear stage is controlled by a specified smoothing step function (S) 33, which is cubic in nature. After the vector information has been processed by the trilinear interpolator block 34 the resulting noise value is then transmitted to the shader 12 on line 21.

A drawback associated with conventional rendering engines and noise generators such as illustrated in FIGS. 1 and 2 is that the noise value (transmitted on line 21) is individually calculated for each pixel of the object to be rendered. In this fashion, there is no reusing of any previously computed noise values. Thus, the noise value generated from a prior pixel or a prior group of pixels is not subsequently reused. This results in a waste of valuable computation power and time as the particular amount of noise that needs to be applied to neighboring pixels of a point of interest has to be individually calculated.

Another drawback associated with conventional noise generators is that the components of the noise generator, as illustrated in FIG. 2, need to be replicated many, many times on an integrated circuit chip or graphics processing chip. As such, the noise generator takes up valuable on-chip real estate, and a corresponding amount of power. The present invention overcomes the aforementioned and related drawbacks associated with conventional rendering engines, and more particularly, conventional noise generators by providing a rendering engine architecture where gradient noise information is first stored in a fast access cache (e.g. shared) memory before such gradient noise information is transmitted to and used by a corresponding pixel shader. In this fashion, previously calculated noise information can be reused in subsequent noise generation operations, or can be readily obtained for previously calculated pixels.

Figure 3:
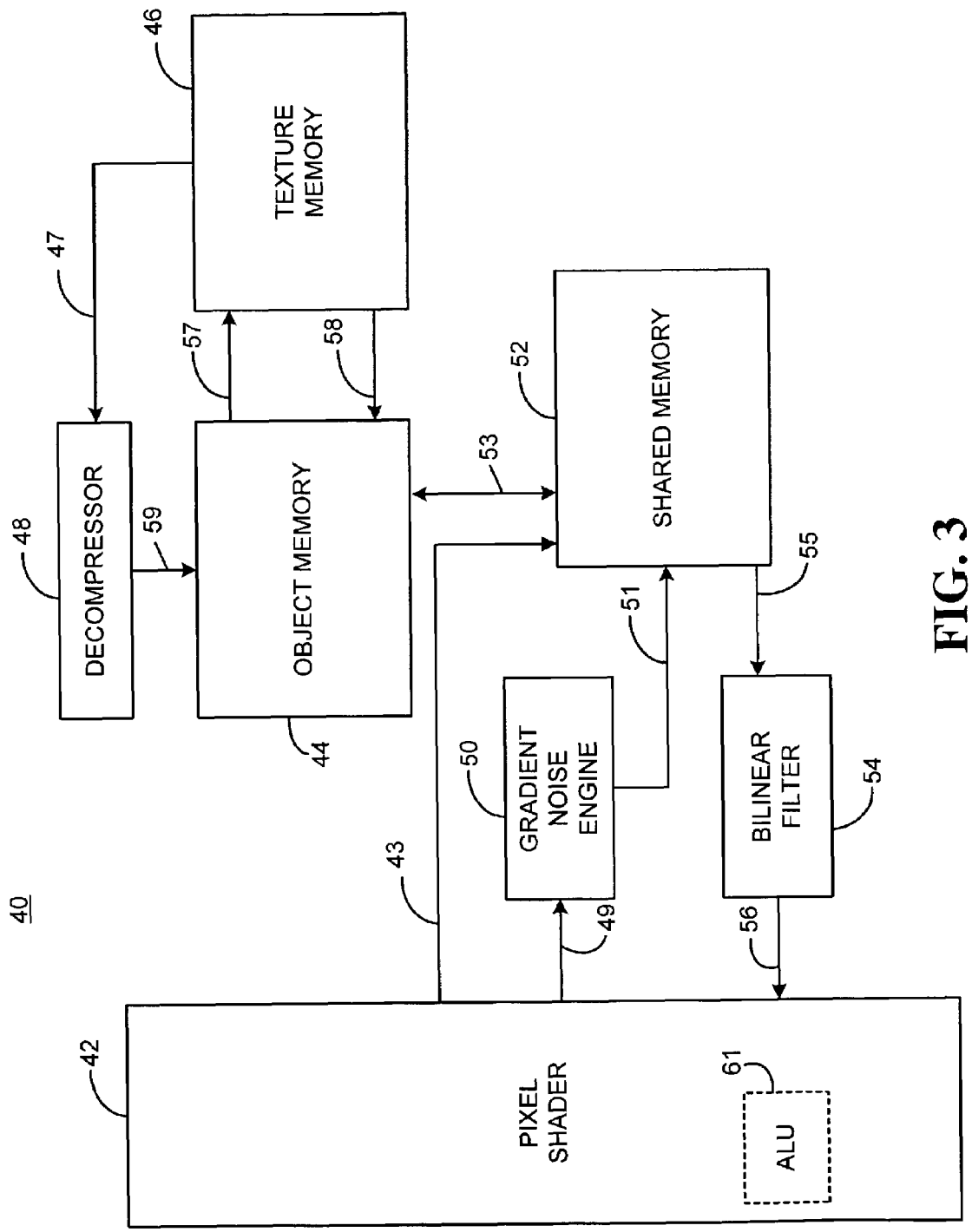
FIG. 3 is a schematic block diagram of a rendering engine incorporating the gradient noise engine according to the present invention.

FIG. 3 is a schematic block diagram of an exemplary rendering engine according to the present invention. The rendering engine 40 includes a pixel shader 42, an object memory 44, which is implemented as an L2 cache, a decompressor circuit 48, a gradient noise engine 50 that generates a noise texture tile according to the present invention, a shared memory 52, implemented as a fast access L1 cache and a bilinear filter 54 which provides filtered pixel appearance (e.g. color, texture or other suitable appearance attribute) data 56 to the pixel shader 42 in response to, for example, noise texture data transmitted on bus 55 from the shared memory 52. A texture memory 46 may be included within the rendering engine 40 or may be implemented external to the rendering engine 40, for example, as part of a larger system memory (not shown). The texture memory 46 is of a sufficient size to store large amounts of texture information, and may provide such texture and other suitable information to the rendering engine 40 in response to a request 57, for example, from the object memory 44.

The pixel shader 42 may be an application program being executed on a processor (not shown) or a dedicated piece of hardware (e.g. ASIC, DSP) operative to generate, for example, the appearance (e.g. color, texture, luminance) value of a requested pixel or group of pixels (e.g. pixel of interest) before such pixels are rendered for presentation on a display device (not shown). The pixel shader may also be a combination of hardware and software. The pixel shader 42 requests the appearance data for a given pixel to be rendered at a particular location within the display by transmitting position data 49, including display coordinate and mipmap level (mml) data, of the pixel to be rendered to the gradient noise engine 50. Additionally, the pixel shader 42 sends a texture request 43, including and a tag identifier and a bit or series of bits indicating whether noise is to be applied to the texture of the pixel to the shared memory 52. The requested appearance data 56 is provided to the pixel shader 42 for subsequent processing, if any, by the bilinear filter 54 as discussed in greater detail below.

Figure 5A:
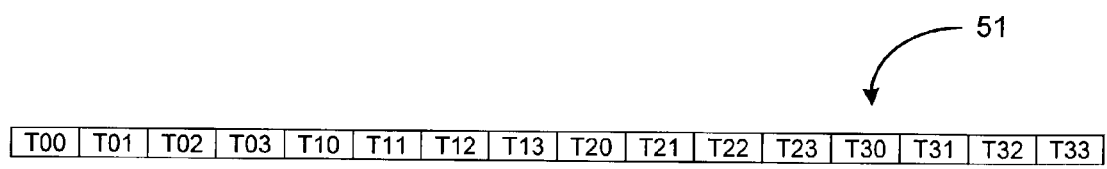
FIGS. 5A-5B are schematic representations of the noise texture tile provided by the gradient noise engine illustrated in FIGS. 3 and 4.
Figure 5B:
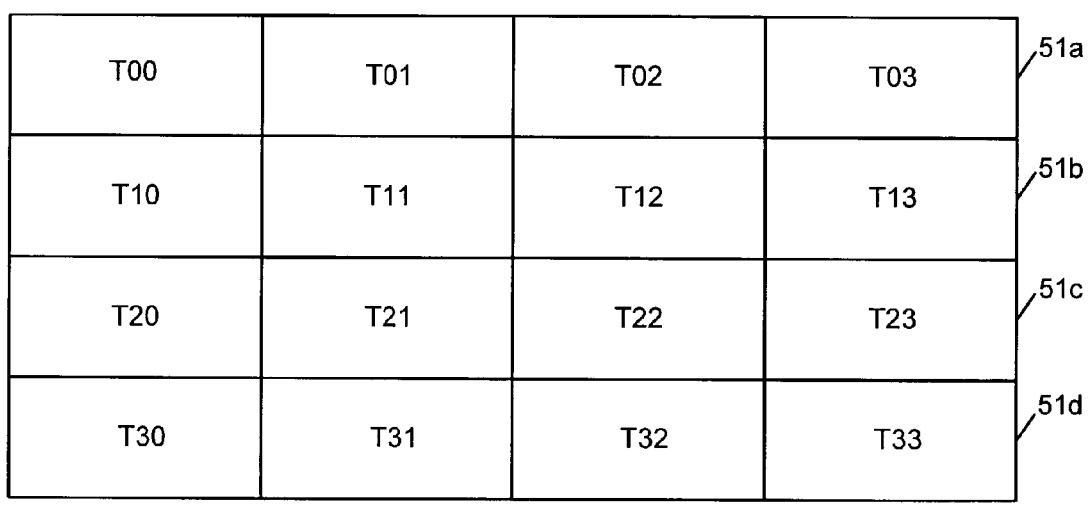

The shared memory 52 is implemented, for example, as a fast access cache having a plurality of lines, each identified by a corresponding tag portion. The lines of the shared memory 52 store both non-noise (e.g. standard) texture data provided, for example, from the object memory 44 and noise texture data, for example, the noise texture tile 51 generated by the gradient noise engine 50 for subsequent use. Referring briefly to FIGS. 5A and 5B, the noise texture tile 51 includes four texels (e.g. Tx0-Tx3) 51a-51d, where each texel corresponds to the texture associated with a pixel to be rendered and the neighboring three pixels. Although illustrated as including four texels 51a-51d, the noise texture tile 51 can be implemented to include any number of texels as appropriate for a given application. As will be appreciated by those or ordinary skill in the art, the texture or appearance of a pixel is determined, at least in part, by the texture or appearance of the neighboring pixels. Referring back to FIG. 3, when no noise is to be applied to the rendered texture (e.g. the noise bits of the texture request have a first predetermined value), the shared memory 52 is initially searched to retrieve the requested texture data by determining whether there is a tag match between the tag identifier contained with the texture request 43 and the tag portion of one of the plurality of lines of the shared memory 52. If there is a tag match, the corresponding texture data is transmitted to the bilinear filter 54 on bus 55 for filtering. The filtered appearance (e.g. texture) data 56 is subsequently transmitted to the pixel shader 42.

If the requested texture data is not present within the shared memory 42, for example, when there is no tag match, a subsequent request for such non-noise texture data is transmitted from the shared memory 52 to the object memory 44 on bi-directional bus 53. If the requested texture data is present within the object memory 44, for example, as determined by a tag match between a tag identifier within the transmitted request and a corresponding tag within the object memory 44, such texture data is transmitted to the shared memory 52 on bus 53 for subsequent transmission to the pixel shader 42. Although described as being bi-directional, the bus 53 may be implemented as a plurality of buses, for example, with one bus carrying the texture data request and another carrying the texture data retrieved from the object memory 44.

On the other hand, if the requested non-noise texture data is not present within the object memory 44, a request 57 is made to the texture memory 46 for such texture data. The requested texture data 58 may be transmitted to the object memory 44 directly from the texture memory 46. Such texture data may then be transmitted to the shared memory 52 on bus 53. The texture memory 46 may also maintain data therein in a compressed format. When the requested texture data is maintained within the texture memory 46 in compressed format, the compressed data 47 is transmitted to the decompressor circuit 48. The decompressor circuit 48 may be any suitable circuit operative to convert the compressed texture data 47 into decompressed data 59; the decompressed data 59 being transmitted to and stored in the object memory 44 for subsequent use. The decompressed data 59 is then transmitted to the shared memory 52 on bus 53 for use in subsequent texture operations.

In the situation where the texture data request 43 indicates that noise is to be applied to the resulting pixel texture (e.g. the noise bits having a second predetermined value), the shared memory 52 is initially searched to retrieve the requested texture data by determining whether there is a tag match between the tag identifier contained within the texture data request 43 and the tag portion of one of the plurality of lines of the shared memory 52. If there is a tag match, the corresponding noise texture data is transmitted to the bilinear filter 54 on bus 55. Thus, the shared memory 52 stores both non-noise texture data and noise texture data. If the requested noise texture data is not present within the shared memory 52, a noise texture tile 51 generated by the gradient noise engine 50 is written into a location (e.g. identified by the position data 49) within the shared memory 52. Any data present in the addressed location will be overwritten or otherwise modified by the noise texture tile 51; thereby, updating the shared memory 52. The updated noise texture data is then transmitted to the bilinear filter 54 on bus 55 for filtering. The bilinear filter 54 performs conventional bilinear filtering on the received texture data, thereby producing the requested appearance data 56 that is transmitted to the pixel shader 42.

As shown in dashed outline, the pixel shader 42 may include an arithmetic logic unit 61 that is operative to blend pixel information to add further texture to an object to be rendered or to provide any additional imaging effects to the object. Additionally, the noise texture tile 51 and the pixel data representing the object can be combined and stored in the shared memory 52. In this manner, the modified pixel data is available for subsequent use.

The rendering engine 40 of the present invention provides a more realistic image of an object by applying the noise texture tile 51 to the pixels that represent an object to be rendered. In practice, the noise texture tile 51 generated by the gradient noise engine 50 is stored in the shared memory 52. By being stored in the shared memory 52, the generated noise texture tile 51 can by reused when determining the amount of noise (or other suitable texture) to be applied to a neighboring pixel or pixels, or provide the noise texture data for a recurring pixel location or pattern. In this fashion, by employing the shared memory 52, the need to calculate a new appearance (e.g. noise) value independently for each pixel within an object to be rendered is not required. Consequently, computational speed and rendering efficiency are greatly increased.

Figure 4:
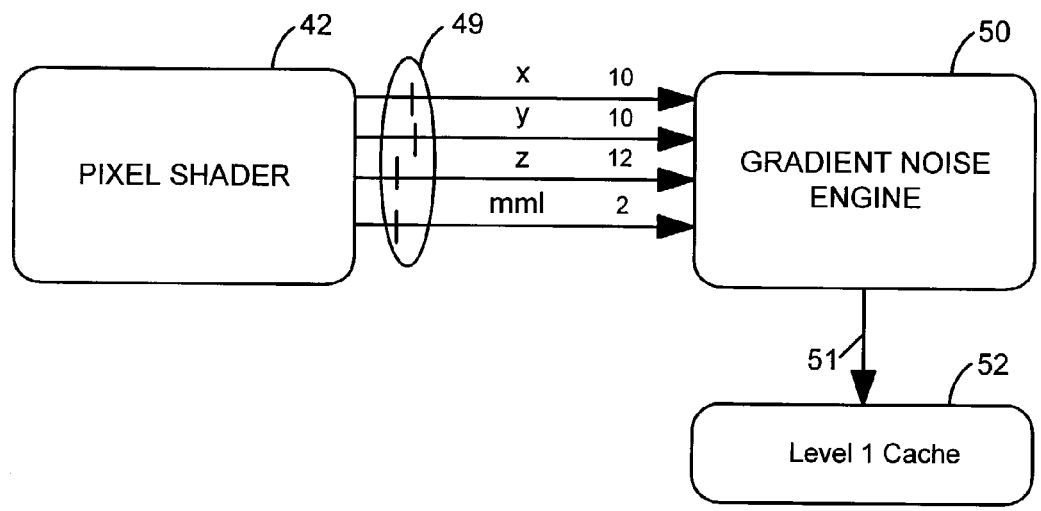
FIG. 4 is a schematic block diagram of the interface to the gradient noise engine according to the present invention.

Referring to FIG. 4, the pixel shader 42 provides position information in display coordinate (e.g. x, y, z or other suitable coordinate) space to the gradient noise engine 50 in order to generate the gradient noise texture tile 51 that is to be applied to the corresponding pixels stored in the shared memory 52. In application, the pixel shader 42 is coupled to the gradient noise engine 50 via interface 49 that includes the position information (e.g. three fixed-position entries representing the location of the pixels that form the object) and a two-bit mipmap level (mml) value related to the pixel of interest. After receiving the position and mml data, the gradient noise engine 50 provides the gradient noise texture tile 51 which is stored in the shared memory 52 and applied to the pixel data maintained therein before being transmitted to the pixel shader 42 for rendering. Each value 51*a*-51*d* within the gradient noise texture tile 51 represents a texel of the noise volume. Each texel contains a corresponding noise value which ranges from negative one to positive one.

Figure 6:
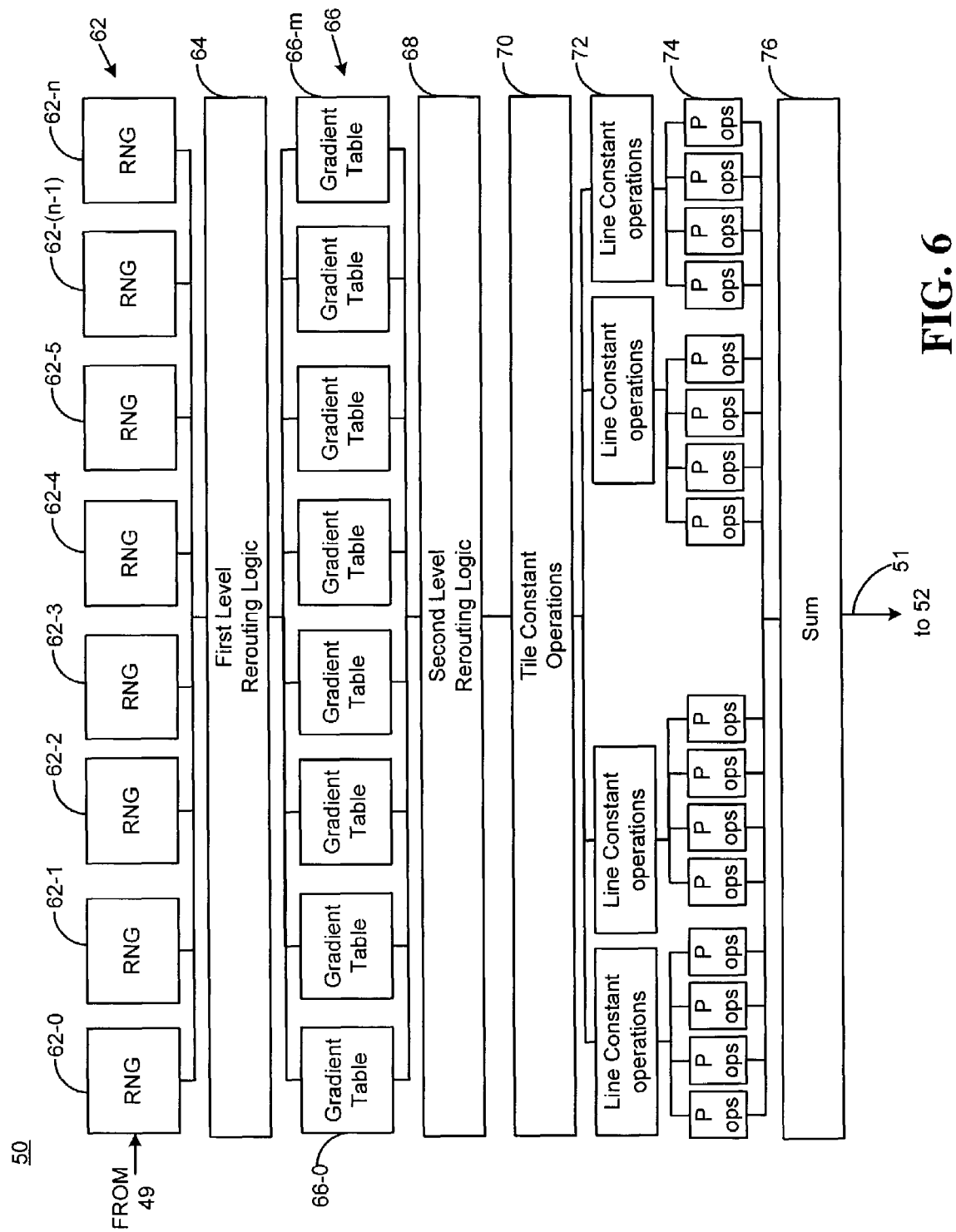
FIG. 6 is a schematic block diagram of the gradient noise engine according to the present invention.

Referring to FIG. 6, the gradient noise engine 50 of the present invention includes a random number generation circuit 62, a first level rerouting logic circuit 64, a gradient table circuit 66, second level rerouting logic circuit 68, and a cubic interpolation circuit which includes a tile constant operations circuit 70, line constant operation circuit 72 and pixel operation circuit 74. The output of the plurality of pixel operators (e.g. Pops) that form the pixel operation circuit 74 are coupled to an addition (e.g. sum) circuit 76 which provides the gradient noise texture tile 51 that is subsequently transmitted to the shared memory 52.

The random number generation circuit 62 includes a plurality of random number generators 62-0 to 62-*n*, that individually select an 8-bit number from a sixteen entry permutation table in random fashion, based on the position information 49 from the pixel shader 42. An exemplary permutation table contains a scrambled (e.g. randomly ordered) set of integers ranging from (0-15) for example [12, 0, 2, 15, 3, 9, 14, 1, 13, 5, 4, 7, 11, 8, 6, 10]. The selected number is then used as an index to access one of the plurality of gradient tables (66-0 to 66-*m*) that make up the gradient table circuit 66. An exemplary gradient table circuit 66 includes eight tables (m=7) having sixteen line entries, each containing a different set of information. This is in contrast to conventional gradient noise generators where the several tables contain identical information. Thus, there are eight random number generators (n=7) in the random number generation circuit 62 as there is one random number generator corresponding to each gradient table.

The random number generation circuit 62 is implemented in hardware and performs the operations illustrated in FIG. 7 and presented by the pseudo code as discussed in greater detail below. However, it will be appreciated by those of ordinary skill that the random number generation circuit 62 may be implemented in software which is executed on a suitable processing device (not shown), or a combination of software and hardware. Thus, any software code, hardware implementation or combination of hardware and software exhibiting the following or equivalent functionality is contemplated by the present invention and is within the spirit and scope of the invention defined herein.

Each gradient table 66-0 to 66-m contains a normalized vector in position coordinate space (e.g. x, y, z) that is used to generate a portion of the final noise texture tile that is to be applied to the pixels representing a corresponding object (present in the coordinate space) before rendering by the pixel shader 42. Each gradient table 66-0 to 66-m has a random number generator 62-0 to 62-n associated therewith that provides a value which acts an index to access one of the gradient tables 66-0 to 66-m. Initially, gradient table 66-0 is associated with random number generator 62-0; gradient table 66-1 is associated with random number generator 62-1; gradient table 66-2 is associated with random number generator 62-2; gradient table 66-3 is associated with random number generator 62-3; gradient table 66-4 is associated with random number generator 62-4, etc. The exemplary implementation ends with gradient table 66-7 being initially associated with random number generator 62-7. The random number generators 62-x each perform the same operation in simultaneous fashion. Thus, the operation of random number generator 62-0 will be discussed to introduce and describe the operation of all the random number generators. It will be appreciated by those of ordinary skill, that the remaining random number generators 62-1 to 62-n will operate in substantially the same fashion as random number generator 62-0.

Figure 7:
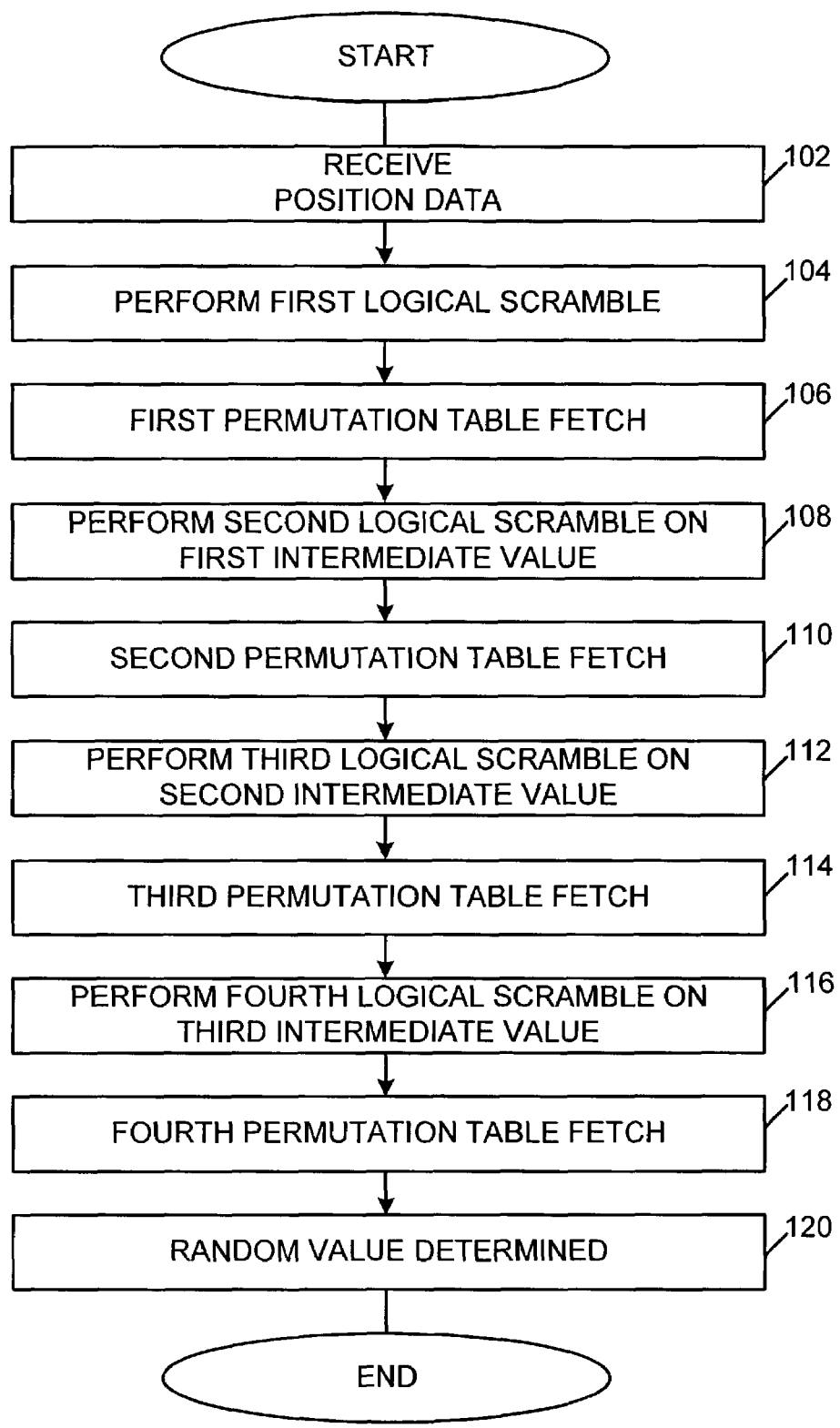
FIG. 7 is a flow chart illustrating the steps performed by the random number generation circuit employed by the gradient noise engine illustrated in FIG. 6.

Referring now to FIG. 7, the random number generation process begins at step 102 with the random number generator 62-0 receiving the integer portion of the position data 49 from the pixel shader 42. Exemplary pseudo code for such operation would be as follows:

```
ix=x; iy=y; and iz=z
```

This initial position data will be used to generate the random number as described in greater detail below.

In step 104, a first intermediate value is generated by performing a first logical scramble (i.e. shuffle) operation on the initial position (e.g. input) data. Exemplary pseudo code for performing this operation is provided below:

```
temp3=((ix^iz) & 0x00f0)>>4;
temp4=(ix^iz) & 0x000f);
``` where temp3 contains the highest order 4 bits resulting from the XOR of ix and iz; and temp4 contains the lowest order 4 bits from the XOR of ix and iz.

In step 106, a first fetch from the permutation table is performed as indexed by generated values temp3 and temp4 to provide the first intermediate value as illustrated by the following pseudo code:

```
t1=smallperm[temp3];
t2=smallperm[temp4].
```

In step 108, a second intermediate value is generated by performing a second logical scramble on the first intermediate value as illustrated by the following pseudo code:

```
t1=t1+(temp3 <<4);
t2=t2+(temp4<<4);
noise1=t2+(iy<<8)+(ix<<16)+(t1<<24);
```

```
temp3=((iy^iz) & 0x00f0)>>4;
temp4=(iy^iz) & 0x000f;
``` where temp3 contains the highest order four bits resulting from the XOR of iy and iz and temp4 contains the lowest order four bits from the XOR of iy and iz.

In step 110, a second fetch from the permutation table is performed as indexed by the values temp3 and temp4 to provide the second intermediate value. Exemplary pseudo code for performing this operation is provided below:

```
t1=smallperm[temp3];
t2=smallperm[temp4].
```

In step 112, a third intermediate value is generated by performing a third logical scramble on the second intermediate value as illustrated by the exemplary pseudo code provided below:

```
t1=t1+(temp3<<4);
t2=t2+(temp4<<4);
noise2=t1+(ix<<8)+(t2<<16)+(iy<<24);
noise=noise1^noise2;
t1=noise & 0x0000ffff;
t2=(noise & 0xffff0000)>>16;
noise=t1^t2
ix=noise & 0x000000ff;
iy=noise & 0x0000ff00;
iy=iy>>8;
temp1=(ix & 0x00f0)>>4;
temp2=ix & 0x000f;
```

In step 114, then, a third fetch from the permutation table is performed as indexed by the above-generated values temp1 and temp2 to provide the third intermediate value. Exemplary pseudo code for performing this operation is provided below:

```
temp1=smallperm[temp3];
temp2=smallperm[temp4];
```

In step 116, a fourth intermediate value is generated by performing a fourth logical scramble on the third intermediate value. Exemplary pseudo code for performing this operation is provided below:

```
ix=(temp1<<4)+temp2;
temp1=(iy & 0x00f0)>>4;
temp2=iy & 0x000f;
```

In step 118, a fourth fetch from the permutation table is performed indexed by the above-identified generated value temp1 and temp2 to provide the fourth intermediate value. Exemplary pseudo code for performing this operation is provided below:

```
temp1=smallperm[temp1];
temp2=smallperm[temp2];
```

In step 120, the resulting random number is determined by the random number generator 62-0 by assigning a value from the permutation table to variable iy and then logically XOR such value to the current value of ix as illustrated by the exemplary pseudo code below:

```
iy=(temp1<<4)+temp2;
temp3=ix^iy
return temp3.
```

This 8-bit value, temp3, is then transferred to the first level rerouting logic circuit 64 (FIG. 6) to select (i.e, index) one of the plurality of gradient tables 66-0 to 66-m.

The first level rerouting logic circuit 64 will now be described with reference to FIGS. 8 and 9A-9B. For purposes of illustration and to provide the reader with a better understanding of the rerouting logic circuit 64, reference is made to FIG. 9A that illustrates the plurality of gradient tables 82-96 which are realigned and accessed according to the present invention and FIG. 9B which illustrates a cubic structure 80', representing the rerouting (or realignment) of gradient tables by the rerouting logic circuit 64 with respect to a corresponding pixel. In this manner, face 82 (FIG. 9B) corresponds to gradient table 0 (FIG. 9A). Face 84 (FIG. 9B) corresponds to gradient table 4 (FIG. 9A). Face 86 (FIG. 9B) corresponds to gradient table 2 (FIG. 9A); Face 88 (FIG. 9B) corresponds to gradient table 6 (FIG. 9A); Face 90 (FIG. 9B) corresponds to gradient table 1 (FIG. 9A); Face 92 (FIG. 9B) corresponds to gradient table 5 (FIG. 9A); and Face 96 corresponds to gradient table 7 (FIG. 9A).

Figure 8:
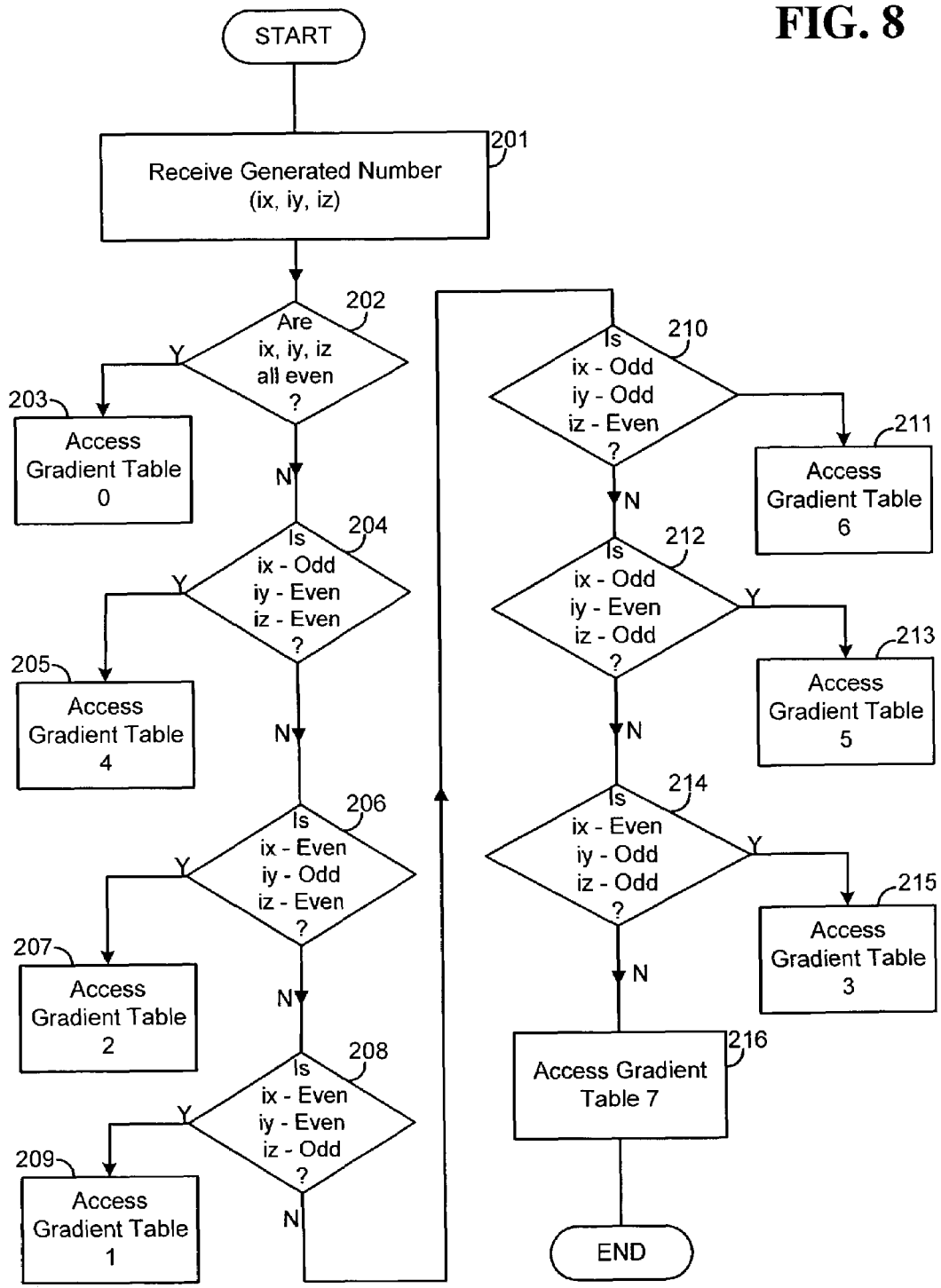
FIG. 8 is a flow chart illustrating the steps performed by the rerouting logic circuit of the gradient noise engine illustrated in FIG. 6.
Figure 9R:
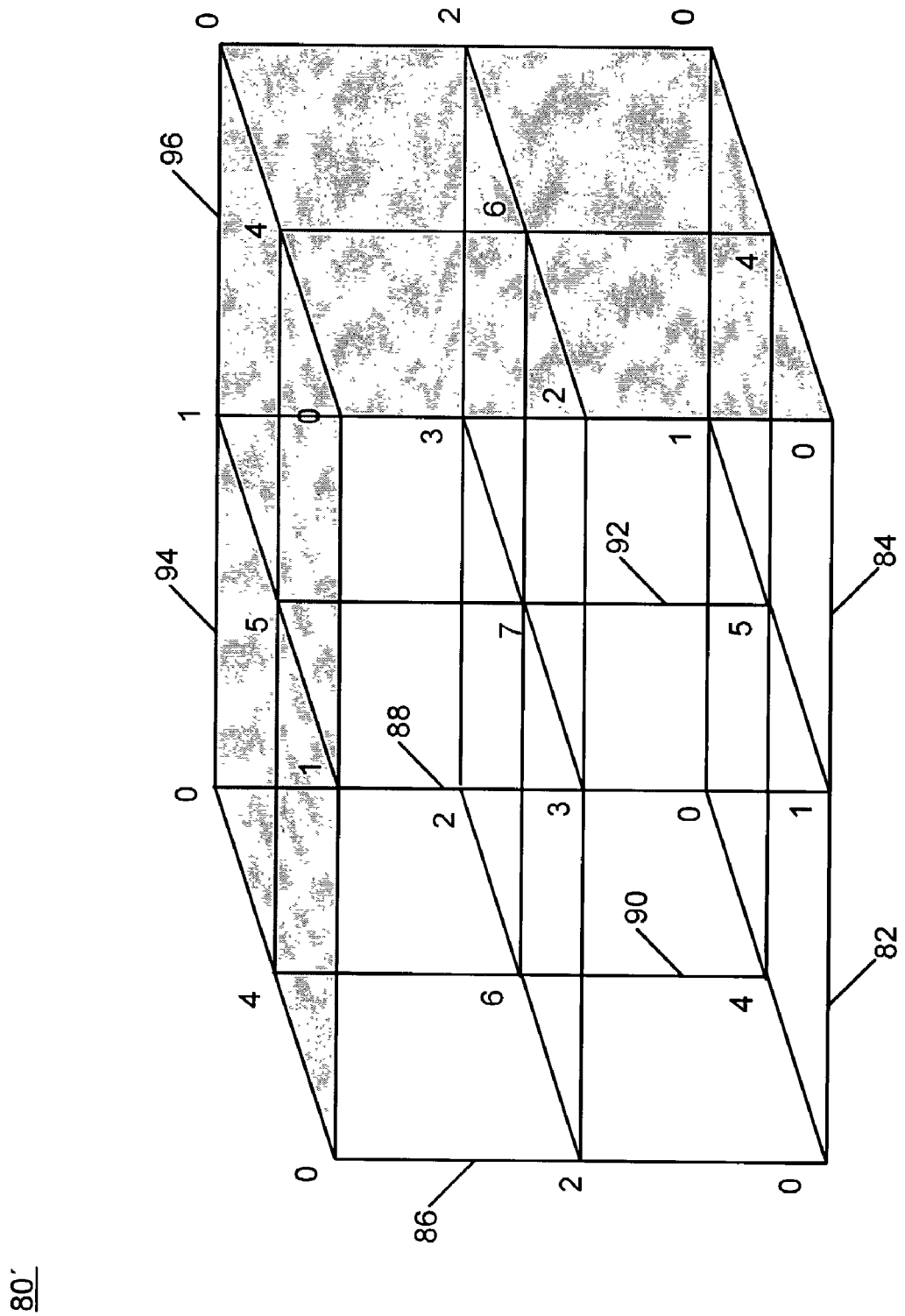
FIGS. 9A and 9B are graphical representations of the rerouting operation performed by the rerouting logic circuit of the gradient noise engine and the gradient tables accessed by the rerouting logic circuit, respectively, according to the present invention.

As illustrated in FIG. 8, the first level rerouting logic circuit 64 receives the randomly generated number from a corresponding random number generator 62-x (step 201) and stores the integer portion thereof into corresponding variables ix, iy, and iz, respectively.

In step 202, a determination is made as to whether the integer components of the received number are all even. In an exemplary embodiment, this is accomplished by determining whether the x-component of the received number (ix modulo 2) is equal to zero; whether the y-component of the received number (iy modulo 2) is equal to zero; and whether the z-component of the received number (iz modulo 2) is equal to zero. If each of the integer components of the received number is zero, no rerouting is performed and gradient table 0 will be the gradient table that is accessed (step 203) 0 to provide the normal vectors to be used to generate the noise at pixel location zero.

If each of the integer components of the received number are not zero, the process moves to step 204 where a determination is made as to whether the x-component of the received number (ix modulo 2 !=0) is odd; whether the y-component of the received number (iy modulo 2=0) is even; and whether the z-component of the received number is (iz modulo 2=0) is even. If the corresponding integer components are odd, even and even, respectively, the process moves to step 205 where gradient table 4 is to be accessed to provide the corresponding noise vectors to pixel location zero. This corresponds to moving from face 82 to face 84 (FIG. 9B).

If the corresponding integer components of the received number are not determined to be odd, even and even, respectively, the process moves to step 206 where a determination is made as to whether the x-component of the received number (ix modulo 2=0) is even; whether the y-component of the received number (iy modulo 2 !=0) is odd; and whether the z-component of the received number (iz modulo 2=0) is even. If the corresponding integer components are even, odd and even, respectively, the process moves to step 207 where gradient table 2 is to be accessed to provide the corresponding noise vectors to pixel location zero. This corresponds to moving from face 82 to face 86 (FIG. 9B).

If the corresponding integer components of the received number are not determined to be even, odd and even, respectively, the process proceeds to step 208 where a determination is made as to whether the x-component of the received number (ix modulo 2=0) is even; whether the y-component of the received number (iy modulo 2=0) is even; and whether the z-component of the received number (iz modulo 2 !=0) is odd. If the corresponding integer components are even, even and odd, respectively, the process moves to step 209 where gradient table 1 is accessed to provide the corresponding noise vectors to pixel location zero. This corresponds to moving from face 82 to face 90 (FIG. 9B).

If the corresponding integer components of the received number are not even, even and odd, respectively, the process moves to step 210 where a determination is made as to whether the x-component of the received number (ix modulo 2 !=0) is odd; whether the y-component of the received number (iy modulo 2 !=0) is odd; and whether the z-component of the received number (iz modulo 2=0) is even. If the corresponding integer components are odd, odd and even, respectively, the process moves to step 211 where gradient table 6 is accessed to provide the corresponding noise vectors to pixel location zero. This corresponds to moving from face 82 to face 88 (FIG. 9B).

If the corresponding integer components of the received number are not odd, odd and even, respectively, the process moves to step 212 where a determination is made as to whether the x-component of the received number (ix modulo 2 !=0) is odd; whether the y-component of the received number (iy modulo 2=0) is even; and whether the z-component of the received number (iz modulo 2 !=0) is odd. If the corresponding integer components are odd, even and odd, respectively, the process proceeds to step 213 where gradient table 5 is accessed to provide the corresponding noise vectors to pixel location zero. This corresponds to moving from face 82 to face 92 (FIG. 9B).

If the corresponding integer components of the received number are not odd, even, and odd, respectively, the process moves to step 214 where a determination is made as to whether the x-component (ix modulo 2=0) is even; whether the y-component of the received number (iy modulo 2 !=0) is odd; and whether the z-component of the received number (iz modulo 2 !=0) is odd. If the corresponding integer components are determined to be even, odd and even, respectively, the process moves to step 215 where gradient table 3 is accessed to provide the corresponding noise vectors to pixel location zero. This corresponds to moving from face 82 to face 94 (FIG. 9B).

If the corresponding integer components of the received number are not even, odd and odd, respectively, the process moves to step 216 where gradient table 7 is accessed to provide the noise vectors to pixel location zero. This corresponds to moving from face 82 to face 96 (FIG. 9B). The aforementioned first level rerouting process is performed for each of the pixels that neighbor pixel zero; thereby, resulting in a random distribution of noise vectors for each pixel.

Once the appropriate gradient table to be accessed for each pixel has been determined by the first level rerouting logic circuit 64, the gradient tables (i.e. the information maintained in the respective gradient tables) need to be realigned with the corresponding pixels. This secondary realignment process is performed by second level rerouting logic 68 (FIG. 6). The second level rerouting logic 68 applies the noise vectors from each of the plurality of gradient tables 66-m to the appropriate pixel locations by performing the inverse of the routing performed by the first level rerouting logic circuit 64. In this fashion, based on the example illustrated in FIG. 8, the normal vectors maintained in gradient table 4 are applied to pixel location zero if the result of step 204 is odd, even, even. The normal vectors maintained in gradient table 2 are applied to pixel location zero if the result of step 206 is even, odd and even. The normal vectors maintained in gradient table 1 are applied to pixel location zero if the result of step 208 is even, even and odd. The normal vectors of gradient table 6 are applied to pixel location zero if the result of step 210 is odd, odd and even. The normal vectors of gradient table 5 are applied to pixel location zero if the result of step 212 is odd, even and odd, respectively. Finally, the normal vectors of gradient table 3 are applied to pixel location zero if the result of step 214 is even, odd and odd, respectively.

Figure 10:
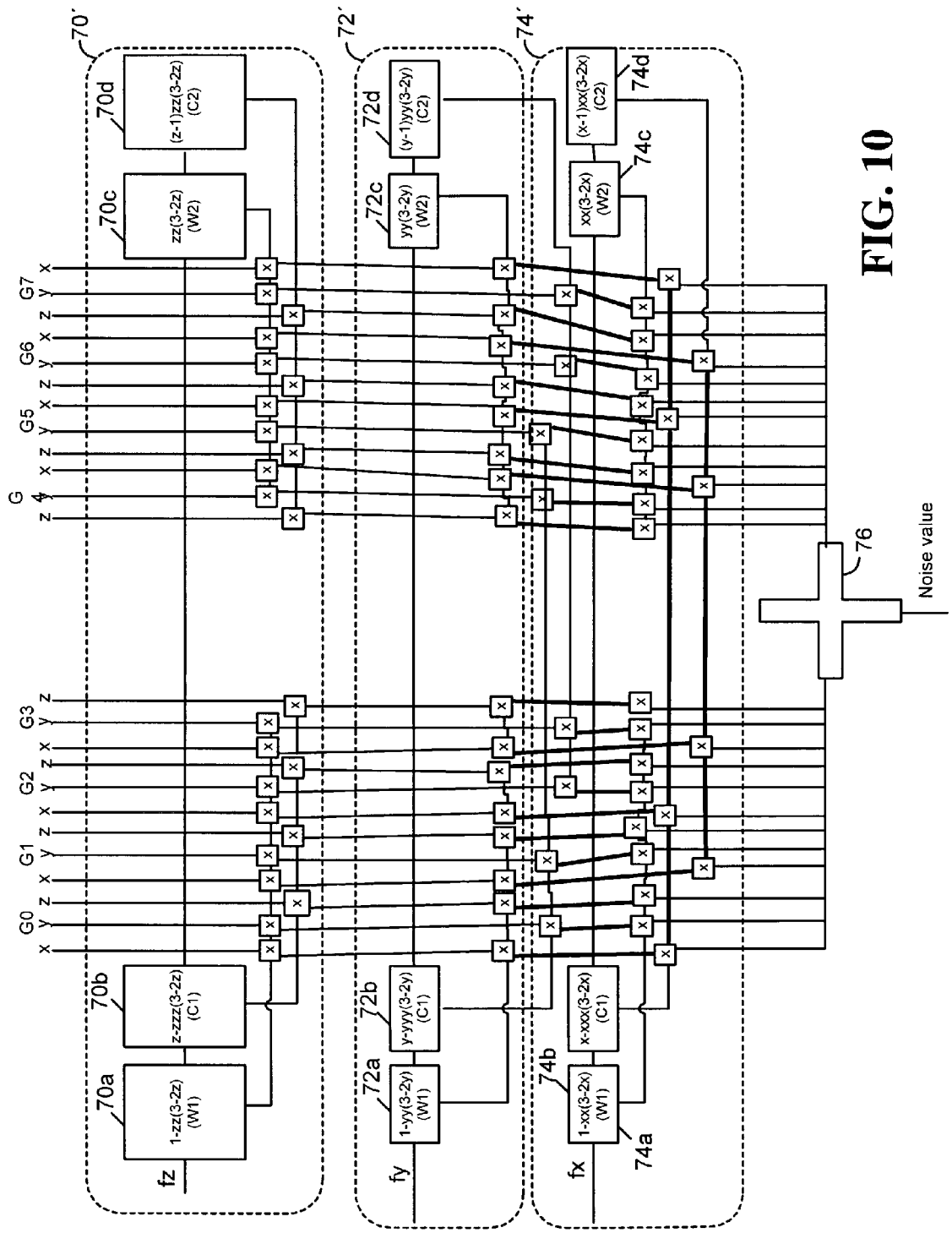
FIG. 10 is a schematic representation of the operations performed by the tile, line and pixel level component hardware, respectively, of the gradient noise engine illustrated in FIG. 6.

This second level rerouting is performed for each pixel of the object. After the realignment has been completed, the noise vectors from the eight realigned gradient tables are operated on by appropriate circuitry that determines the noise value according to the following equation:

$$N=(((x*X0+y*Y0+z*Z0)*(1-x^2(3-2x))+((x-1)*X1+\\(y-1)*Y1+(z-1)*Z1)*(x^2(3-2x)))(1-y^2(3-2y))+$$

$$((x*X2+y*Y2+z*Z2)*(1-x^2(3-2x))+((x-1)*X3+(y-1)\\*Y3+(z-1)*Z3)*(x^2(3-2x)))\ (y^2(3-2y)))(1-z^2(3-2z))+$$

$$(((x*X4+y*Y4+z*Z4)*(1-x^2(3-2x))+((x-1)*X5+(y-1)\\*Y5+(z-1)*Z5)*(x^2(3-2x)))(1-y^2(3-2y))+$$

$$((x*X6+y*Y6+z*Z6)*(1-x^2(3-2x))+((x-1)*X7+(y-1)\\*Y7+(z-1)*Z7)*(x^2(3-2x)))(y^2\ (3-2y)))(z^2(3-2z))$$

where x, y, z, represent the fractional components of the position information 49 provided by the pixel shader 42; "*" means arithmetic multiplication; and XN, YN, ZN, where N has a value from 0-7 represent the values obtained from the corresponding gradient tables. As illustrated above, the gradient noise, N, provided by the gradient noise generator 50 is obtained by linearly interpolating linear functions using a smooth cubic function. More specifically, and with reference to FIG. 10, the noise vectors contained within the eight realigned tables are multiplied by a corresponding set of weighing functions 70a-70d on the tile level in the tile constant circuit 70 as illustrated in 70'; then the tile level values are multiplied by a corresponding set of weighing functions 72a-72d on the line level in the line constant operations circuit 72 as illustrated in 72'; and then the line weighed modified values are multiplied by a corresponding set of weighing functions 74a-74d on the pixel level in the pixel operations circuit 74 as illustrated in 74'. After being operated on by the several weighing functions, the multiplicands are then added together in addition (e.g. sum) circuit 76, thereby producing a 4×4 gradient noise texture tile 51 that represents the noise texture to be applied to the object. Although being described as a 4×4 tile, the resulting noise texture tile 51 can have size (T×T) where T has a minimum value of two (2).

In contrast to conventional noise generators, the noise texture tile 51 generated according to the present invention, is transmitted to the shared memory 52 (FIG. 3) for storage and subsequent reuse. This provides the advantage that previously calculated noise texture information can be reused when determining the noise texture of subsequent, or neighboring tiles. In addition, if noise information is required of a previously rendered tile, such information can be quickly accessed from the shared memory 52. This results in a time efficiency in two different ways: (1) corresponding information does not have to be retrieved from a larger and often times slower cache memory as is conventionally done (FIG. 1); and (2) noise information from a frequently requested or used tile does not have to be recalculated each time such information is required. In this fashion, computational efficiency is enhanced.

In addition to enhance computational efficiency, the rendering engine of the present invention also provides for more efficient use of space by the fact that previously calculated noise texture tile information is stored for subsequent reuse. By storing previously calculated values, the gradient noise engine can be reduced in size as the components that comprise the gradient noise engine do not have to be repeated as often as compared with conventional rendering engines because noise values are generated on a tile basis and not an individual pixel basis.

The above detailed description of the invention and the examples described therein have been provided for the purposes of illustration and description. It is therefore contemplated that the present invention cover any and all modifications, variations and/or equivalents that fall within the spirit and scope of the basic underlying principles disclosed and claimed herein.

What is claimed is:

1. A method for generating noise for a pixel, comprising:
   receiving a plurality of pixel values;
   receiving pixel position information;
   generating a plurality of intermediate values, with each successive intermediate value being based on a preceding intermediate value, wherein generating the plurality of intermediate values comprises fetching information from a permutation table based on the pixel position information for at least one of the intermediate values;
   generating a final value representing a random number based on a subset of the plurality of intermediate values;
   using the random number to index at least one of a plurality of gradient noise tables;
   applying noise information from the at least one of the plurality of gradient noise tables to at least one pixel for later display; and
   storing in memory one or more of: the noise information and the at least one pixel to which the noise information was applied.

2. The method of claim 1, wherein generating a plurality of intermediate values further comprises:
   logically scrambling a first portion of the pixel position information;
   selecting from a plurality of values a first intermediate value indexed by the first logically scrambled data;
   logically scrambling a second portion of the pixel position information;
   selecting from the plurality of values a second intermediate value indexed by the second logically scrambled data;
   logically scrambling the pixel position information; and
   selecting from the plurality of values a third intermediate value indexed by the logically scrambled data.

3. The method of claim 2, further comprising:
   generating a fourth intermediate value from the third intermediate value; and
   manipulating the third intermediate value by the fourth intermediate value.

4. The method of claim 3, wherein the manipulation step further comprises performing a logical exclusive-OR operation between the third intermediate value and the fourth intermediate value.

5. The method of claim 1, wherein generating the final value comprises performing a logical exclusive-OR operation between a first respective one of the plurality of intermediate values and a second respective one of the plurality of intermediate values.

6. The method of claim 2, wherein the first logical scrambling comprises:
   performing an exclusive-OR operation on a first portion of pixel position information; and
   masking off the lowest order bits from the result of the exclusive-OR operation.

7. The method of claim 2, wherein the second logical scrambling comprises:

performing an exclusive-OR operation on a second portion of the pixel position information; and masking off the lowest order bits from the result of the exclusive-OR operation.

8. The method of claim 2, wherein the third logical scrambling comprises:

generating a fifth value based on the first intermediate value;

generating a sixth value based on the second intermediate value;

performing an exclusive-OR operation between the fifth value and the sixth value; and masking off the lowest order bits from the result of the exclusive-OR operation.

9. Memory containing instructions executable by one or more processing devices that cause the one or more processing devices to:

receive a plurality of pixel values;

receive pixel position information;

generate a plurality of intermediate values, with each successive intermediate value being based on a preceding intermediate value, wherein generating the plurality of intermediate values comprises fetching information from a permutation table based on the pixel position information for at least one of the intermediate values;

generate a final value representing a random number based on a subset of the plurality of intermediate values;

use the random number to index at least one of a plurality of gradient noise tables; and apply noise information from the at least one of the plurality of gradient noise tables to at least one pixel for later display.

10. The memory of claim 9 containing executable instructions that cause the one or more processing devices to:

logically scramble a first portion of the pixel position information;

select from a plurality of values a first intermediate value indexed by the first logically scrambled data;

logically scramble a second portion of the pixel position information;

select from the plurality of values a second intermediate value indexed by the second logically scrambled data;

logically scramble the pixel position information; and select from the plurality of values a third intermediate value indexed by the logically scrambled data.

11. An apparatus for generating noise for a pixel comprising:

a circuit operative to:

receive a plurality of values;

receive pixel position information;

generate a plurality of intermediate values, with each successive intermediate value being based on a preceding intermediate value;

wherein the plurality of intermediate values is generated by fetching information from a permutation table based on the pixel position information for at least one of the intermediate values;

generating a final value representing a random number based on a subset of the plurality of intermediate values;

using the random number to index at least one of the plurality of gradient noise tables; and apply noise information from the at least one of the plurality of gradient noise tables to at least one pixel for later display.

* * * * *